United States Patent
Wang et al.

(10) Patent No.: US 10,338,421 B2
(45) Date of Patent: Jul. 2, 2019

(54) DISPLAY DEVICE

(71) Applicant: Shenzhen China Star Optoelectronics Technology Co., Ltd., Shenzhen (CN)

(72) Inventors: Gang Wang, Shenzhen (CN); Lixuan Chen, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 52 days.

(21) Appl. No.: 15/503,705

(22) PCT Filed: Dec. 27, 2016

(86) PCT No.: PCT/CN2016/112256
§ 371 (c)(1),
(2) Date: Feb. 13, 2017

(87) PCT Pub. No.: WO2018/112996
PCT Pub. Date: Jun. 28, 2018

(65) Prior Publication Data
US 2018/0211609 A1    Jul. 26, 2018

(30) Foreign Application Priority Data

Dec. 20, 2016  (CN) .......................... 2016 1 1185794

(51) Int. Cl.
*G02F 1/1333* (2006.01)
*G02F 1/1362* (2006.01)
(Continued)

(52) U.S. Cl.
CPC ...... *G02F 1/133305* (2013.01); *G02F 1/1345* (2013.01); *G02F 1/13452* (2013.01);
(Continued)

(58) Field of Classification Search
CPC ............... G02F 1/1345; G02F 1/13452; G02F 1/133305; G02F 2001/133342;
(Continued)

(56) References Cited

U.S. PATENT DOCUMENTS

| | | | | |
|---|---|---|---|---|
| 6,433,422 B1* | 8/2002 | Yamasaki | ........... | H01L 23/3107 257/203 |
| 2007/0035473 A1* | 2/2007 | Yamazaki | ........... | G02F 1/13318 345/4 |
| 2008/0284971 A1* | 11/2008 | Park | .................. | G02F 1/133305 349/158 |
| 2010/0109993 A1* | 5/2010 | Chang | .................. | G02F 1/1345 345/92 |
| 2012/0112199 A1* | 5/2012 | Son | ....................... | H01L 27/124 257/72 |

(Continued)

FOREIGN PATENT DOCUMENTS

| CN | 20301296 U | * | 6/2013 |
|---|---|---|---|
| CN | 203012296 U | | 6/2013 |

*Primary Examiner* — Sanjiv D. Patel
(74) *Attorney, Agent, or Firm* — Leong C. Lei (57) ABSTRACT

The invention provides a display device, which employs ultra-thin flexible substrate with WOA disposed on both sides of the flexible substrate, wherein the WOA on the front side is directly connected to the active area, and the WOA on the back side passes through the holes in the flexible substrate to extend to the front side to connect to the active area. As such, the circuit area utilization is improved so that the same size of substrate area can carry almost twice the circuit structure to reduce the border width of the non-active area to achieve borderless or ultra-narrow borders.

18 Claims, 5 Drawing Sheets

(51) Int. Cl.
*G09G 3/36* (2006.01)
*G02F 1/1345* (2006.01)

(52) U.S. Cl.
CPC .... *G02F 1/13454* (2013.01); *G02F 1/136227* (2013.01); *G02F 1/136286* (2013.01); *G09G 3/3648* (2013.01); *G02F 2201/42* (2013.01); *G09G 2300/0408* (2013.01); *G09G 2300/0426* (2013.01)

(58) Field of Classification Search
CPC ......... G02F 1/136227; G02F 1/136204; G02F 1/13394; G02F 1/13454; G02F 1/136259; G02F 2001/13629; G02F 1/1309; G02F 2001/136263; G06F 2203/04103; G06F 3/041; G09G 2300/0426; G09G 2300/0408; H01L 31/0508; H05K 1/181; H05K 2201/10545; H05K 2201/10734
See application file for complete search history.

(56) References Cited

U.S. PATENT DOCUMENTS

| | | | |
|---|---|---|---|
| 2013/0233607 A1* | 9/2013 | Nakamura | H05K 1/0206 174/262 |
| 2014/0300649 A1* | 10/2014 | Park | G09G 3/006 345/690 |
| 2014/0307192 A1* | 10/2014 | Stahl | G02F 1/155 349/33 |
| 2015/0022770 A1* | 1/2015 | Yamaguchi | G09F 9/30 349/139 |
| 2015/0108480 A1* | 4/2015 | Xu | H01L 22/22 257/59 |
| 2016/0313478 A1* | 10/2016 | Lee | G02B 5/0242 |
| 2017/0117262 A1* | 4/2017 | Suzuki | H01L 24/83 |

* cited by examiner

DISPLAY DEVICE

BACKGROUND OF THE INVENTION

1. Field of the Invention

The present invention relates to the field of display techniques, and in particular to a display device.

2. The Related Arts

As the display technology progresses, the liquid crystal display (LCD) and organic light-emitting diode (OLED) displays are widely used because of the advantages of high display quality, low power-consumption, and thinness, in applications, such as mobile phones, TV, PDA, digital cameras, notebook PC, desktop PC, and so on consumer products and becomes the mainstream of the display device.

Figure 1:
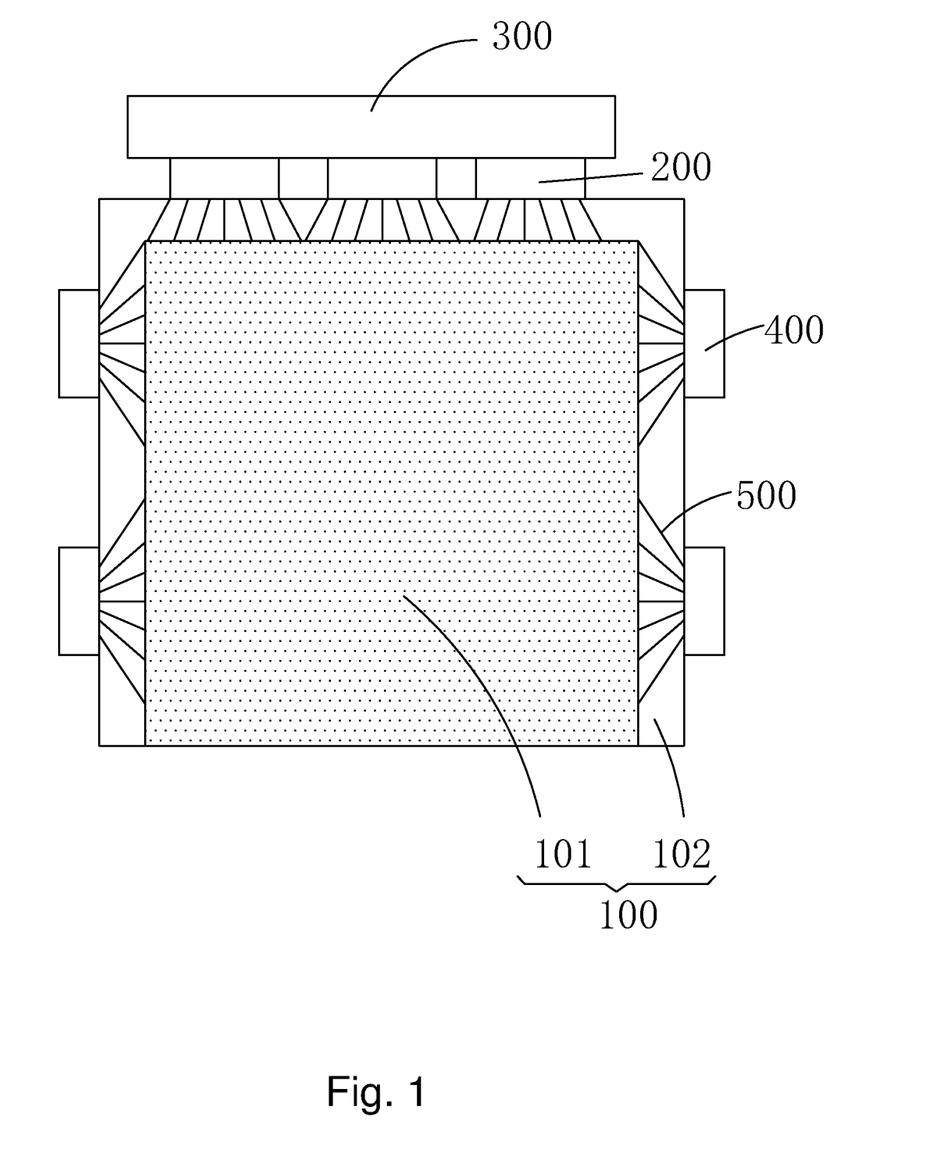
FIG. 1 is a schematic view showing a structure of known display device.

Refer to FIG. 1, the current LCD usually comprises: a display panel 100, a source driver chip 200 electrically connected to the upper side of the display panel 100, two gate driver chips 40 electrically connected respectively to the left and right sides of the display panel 100, and a driver circuit board 300 electrically connected to the source driver chip 200 and the gate driver chips 400. The display panel 100 comprises an active area 101, and non-active area 102 surrounding the active area 101. The active area 101 is disposed with a plurality of horizontal scan lines arranged in parallel and with intervals, and a plurality of vertical source lines arranged in parallel and with intervals. The non-active area 102 is disposed with a plurality of wires on array (WOA) 500 arranged in a fan manner. The WOA 500 connects the plurality of scan lines to the gate driver chips 400 and connects the plurality of source lines to the source driver chip 200. Moreover, as the display technology progresses, the gate driver on array (GOA) is used to replace the gate driver chip, wherein the GOA circuit is directly manufactured on the not-active area of the display panel and directly connected to the scan lines. However, the WOA 500 cannot be eliminated as the WOA 500 is needed to electrically connect the driver circuit board 300 to the GOA circuit.

As the display technology progresses, the narrow borders or borderless are becoming a trend. For both LCD and OLED, narrow borders or borderless displays can provide a better experience. However, the unavoidable WOA around the active area of the panel results in a larger distance between the active area and the edge, which makes it harder to achieve borderless or ultra-narrow borders. In particular, when the resolution of a panel increases from HD to ultra-high definition or even higher, more area is required for the WOA, leading to more difficulty in border reduction. Under the existing technology, the wire width in the panel is limited by the manufacturing equipment precision, the mask accuracy and the conductivity. At present, reducing non-active area width through reducing WOA width is difficult. Therefore, it is imperative to devise a new method to reduce the width of the non-active area of the panel.

SUMMARY OF THE INVENTION

The object of the present invention is to provide a display device, able to reduce the routing area required by the WOA to reduce the size of non-active area and achieve ultra-narrow border borderless.

To achieve the above object, the present invention provides a display device, which comprises: a flexible substrate, and flexible substrate comprising an active area, and an non-active area surrounding the active area;

the non-active area of the flexible substrate being disposed with a plurality of wires on array (WOA) electrically connected to the active area to provide driving signals to the active area;

the WOA being disposed on both front and back sides of the flexible substrate, wherein the WOA disposed on the back side of the flexible substrate having one end passing through a first hole disposed on the flexible substrate and extending to the front side to connect and receive driving signals and the other end passing through a second hole disposed on the flexible substrate and extending to the front side to electrically connected to the active area.

According to a preferred embodiment of the present invention, the material of the flexible substrate is polyimide, polyethylene terephthalate, cycloolefin copolymer, or polyether resin.

According to a preferred embodiment of the present invention, the thickness of the flexible substrate is 10-300 μm.

According to a preferred embodiment of the present invention, the display device further comprises: a driver circuit board, and a source driver chip and a gate driver chip; both electrically connected to the driver circuit board; the WOA is electrically connected to the source driver chip and the gate driver chip respectively.

According to a preferred embodiment of the present invention, the active area is disposed with a plurality of vertical source lines arranged in parallel and with intervals, and a plurality of horizontal scan lines arranged in parallel and with intervals;

each wire of the WOA is electrically connected to a source line or scan line correspondingly.

According to a preferred embodiment of the present invention, the display device further comprises: a driver circuit board, and a source driver chip electrically connected to the driver circuit board; the WOA is electrically connected to the source driver chip and the driver circuit board respectively;

the non-active area is disposed with a gate on array (GOA) circuit, and the WOA is electrically connected to the active area through the GOA circuit.

According to a preferred embodiment of the present invention, the active area is disposed with a plurality of vertical source lines arranged in parallel and with intervals, and a plurality of horizontal scan lines arranged in parallel and with intervals;

each wire of the WOA is electrically connected to a source line or to a scan line through the GOA circuit.

According to a preferred embodiment of the present invention, the plurality of wires of WOA is disposed in the same film layer, and is made of copper.

According to a preferred embodiment of the present invention, the plurality of wires of WOA is disposed in the different film layers separated by insulting layers, and is made of graphene.

According to a preferred embodiment of the present invention, the WOA disposed on the back side of the flexible substrate is covered with a protective layer.

Another embodiment of the present invention provides a display device, which comprises: a flexible substrate, and flexible substrate comprising an active area, and an non-active area surrounding the active area;

the non-active area of the flexible substrate being disposed with a plurality of wires on array (WOA) electrically connected to the active area to provide driving signals to the active area;

the WOA being disposed on both front and back sides of the flexible substrate, wherein the WOA disposed on the back side of the flexible substrate having one end passing through a first hole disposed on the flexible substrate and extending to the front side to connect and receive driving signals and the other end passing through a second hole disposed on the flexible substrate and extending to the front side to electrically connected to the active area;

wherein the material of the flexible substrate being polyimide, polyethylene terephthalate, cycloolefin copolymer, or polyether resin;

wherein the thickness of the flexible substrate being 10-300 μm.

Compared to the known techniques, the present invention provides the following advantages. The present invention provides a display device, which employs ultra-thin flexible substrate with WOA disposed on both sides of the flexible substrate, wherein the WOA on the front side is directly connected to the active area, and the WOA on the back side passes through the holes in the flexible substrate to extend to the front side to connect to the active area. As such, the circuit area utilization is improved so that the same size of substrate area can carry almost twice the circuit structure to reduce the border width of the non-active area to achieve borderless or ultra-narrow borders.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technique means and effect of the present invention, the following uses preferred embodiments and drawings for detailed description.

Figure 2:
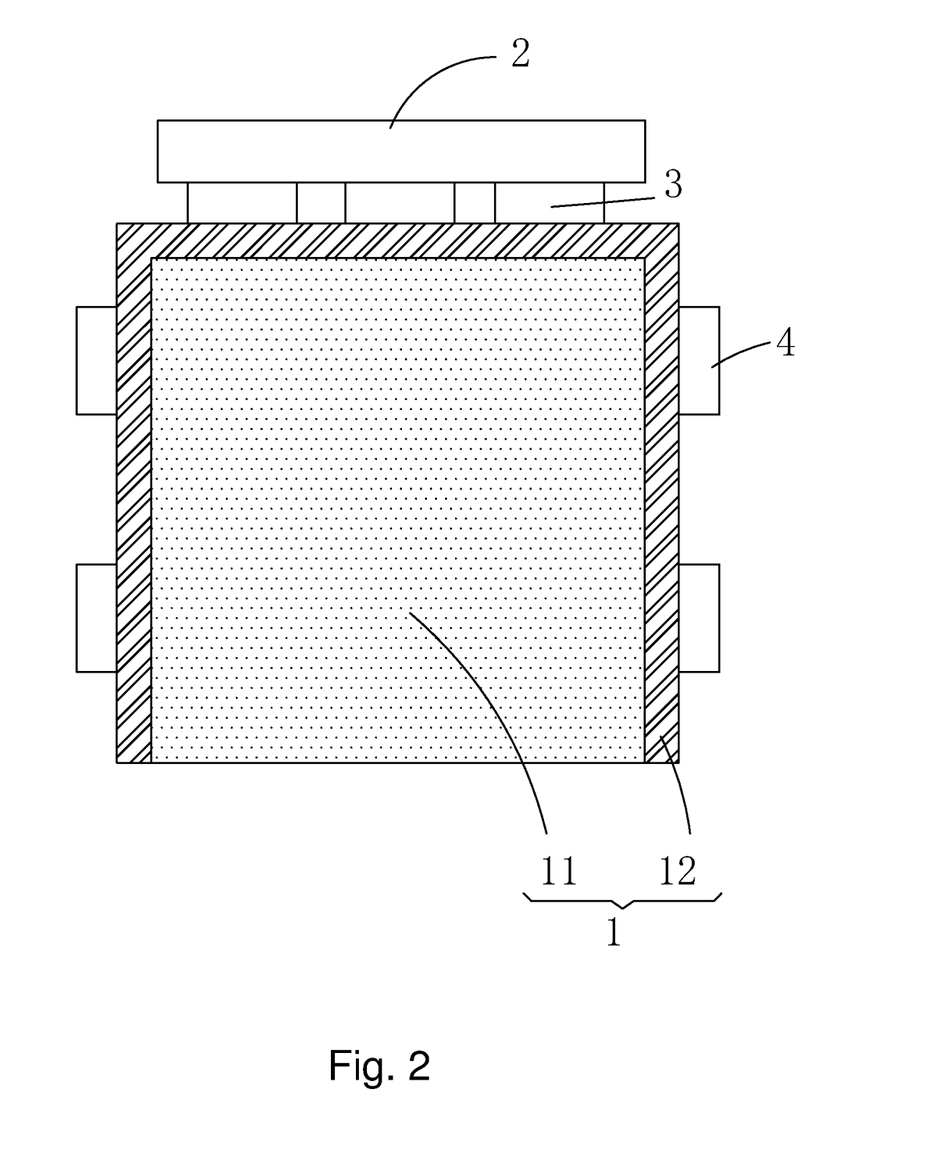
FIG. 2 is a schematic view showing the structure of a display device provided by the first embodiment of the present invention.
Figure 3:
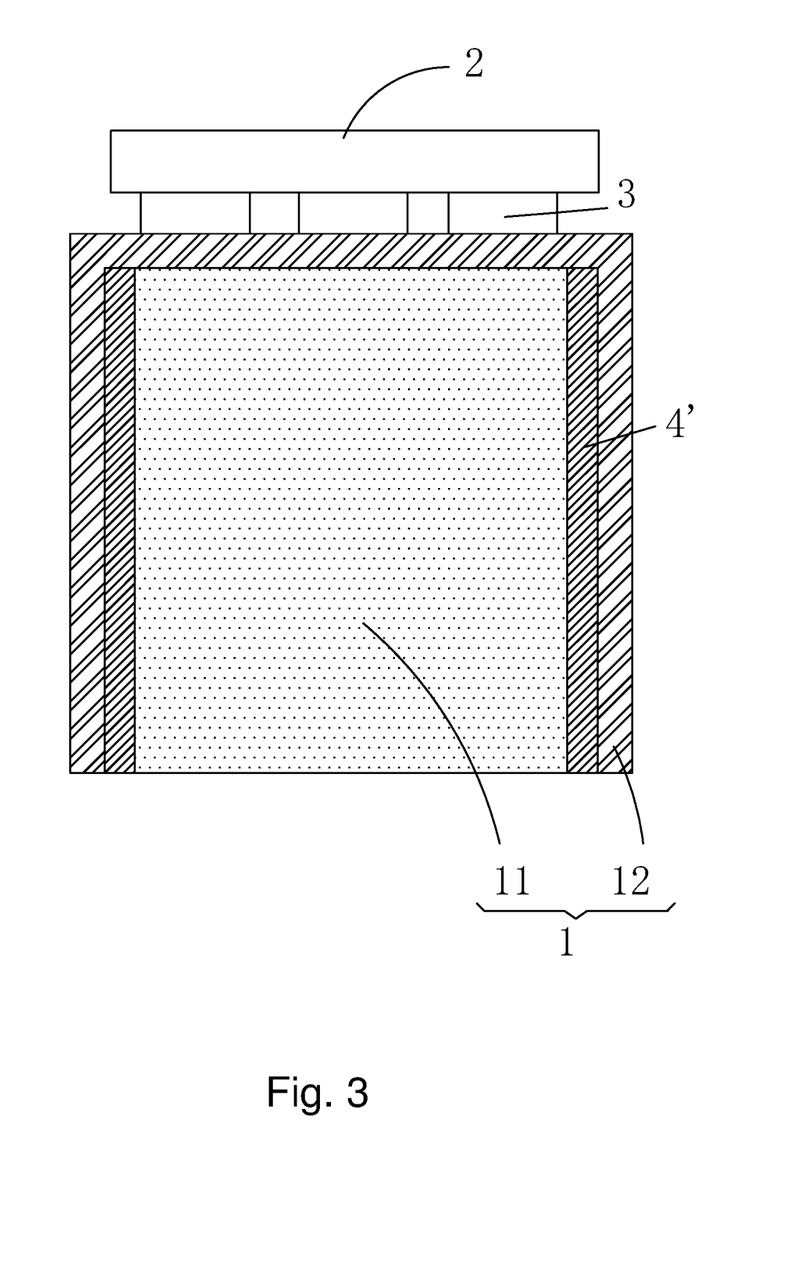
FIG. 3 is a schematic view showing the structure of a display device provided by the first embodiment of the present invention.

Referring to FIG. 2 or FIG. 3, the present invention provides a display device, which comprises: a flexible substrate 1, and flexible substrate 1 comprising an active area 11, and an non-active area 12 surrounding the active area 11.

The non-active area 12 of the flexible substrate 1 is disposed with a plurality of wires on array (WOA) 13 electrically connected to the active area 11 to provide driving signals to the active area 11.

Figure 4:
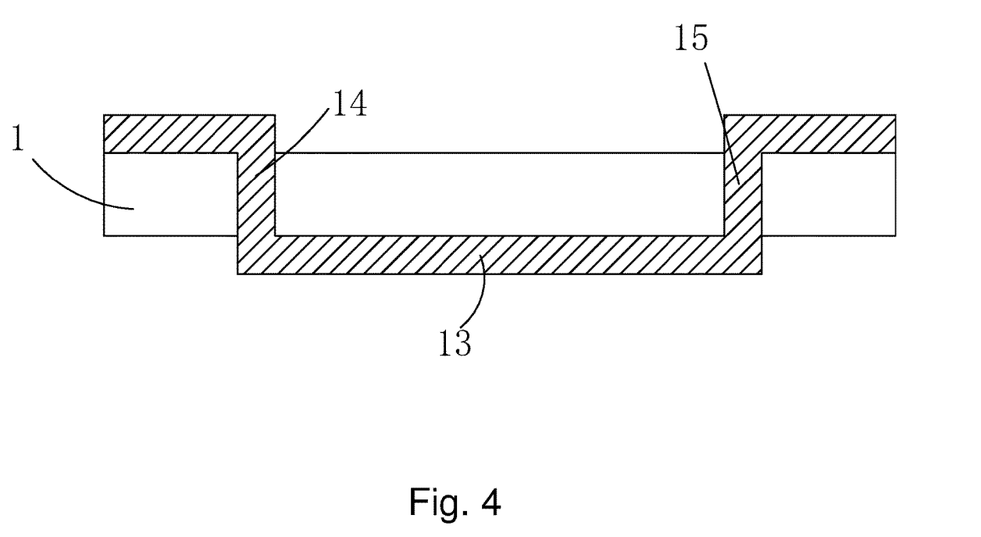
FIG. 4 is a schematic view showing the cross-section of the non-active area of the display device provided by the first embodiment of the present invention.

Referring to FIG. 4, the WOA 13 disposed on both front and back sides of the flexible substrate 1, wherein the WOA 13 disposed on the front side uses the known routing method to directly connected electrically to the active area 11 to provide the driving signals to the active area 11; the WOA 13 disposed on the back side of the flexible substrate 1 has one end passing through a first hole 14 disposed on the flexible substrate 1 and extends to the front side of the flexible substrate 1 to connect and receive the driving signals and the other end passing through a second hole 15 disposed on the flexible substrate and extending to the front side of the flexible substrate 1 to electrically connected to the active area 11.

Specifically, the compared to the known technique using a glass substrate of 0.3-0.7 mm thickness, the flexible substrate 1 of the present invention is a thinner substrate made of materials such as, is polyimide (PI), polyethylene terephthalate (PET), cycloolefin copolymer (COC), or polyether resin (PES), with a thickness of 10-300 μm. By using a laser to form the first hole 14 and the second hole 15 on the flexible substrate 1, and conductive wires are formed inside the first hole 14 and the second hole 15 to accomplish the routing of the WOA 13 on the back side of the flexible substrate 1. Because the thinness of the flexible substrate 1, the process of forming conductive wires inside the first hole 14 and the second hole 15 shows better result.

It should be noted that the plurality of wires of WOA 13 can be disposed in the same film layer, or in different film layers separated by insulting layers. When disposed in the same film layer, the present invention preferably use material with good conductivity, such as, copper (Cu) to manufacture the WOA 13. When disposed in different film layers separated by insulting layers, the present invention preferably use material with good conductivity, such as, copper (Cu) to manufacture the WOA 13, or use metal with low resistance or grapheme to manufacture WOA 13. Because insulating layers exist between the WOA 13 disposed in different film layers, the taper angle of the first hole 14 and the second hole 15 must be small to ensure the multi-layer film quality.

It should be noted that for protecting the WOA 13 disposed on the back side of the flexible substrate 1, the WOA 13 disposed on the back side of the flexible substrate 1 is covered with a protective layer (not shown). The protective layer can be made of protective material, such as, SiOx.

Figure 5:
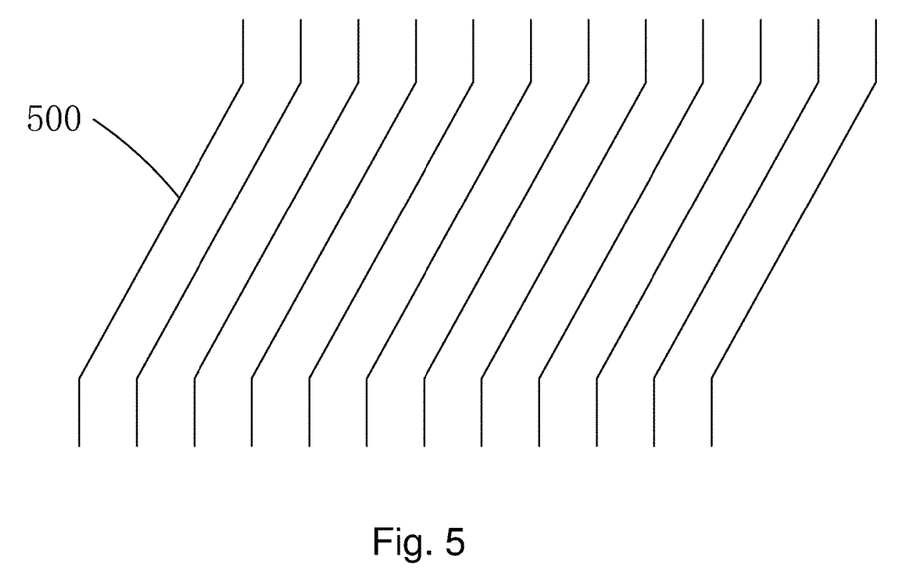
FIG. 5 is a schematic view showing the top view of the non-active area of a known display device.
Figure 6:
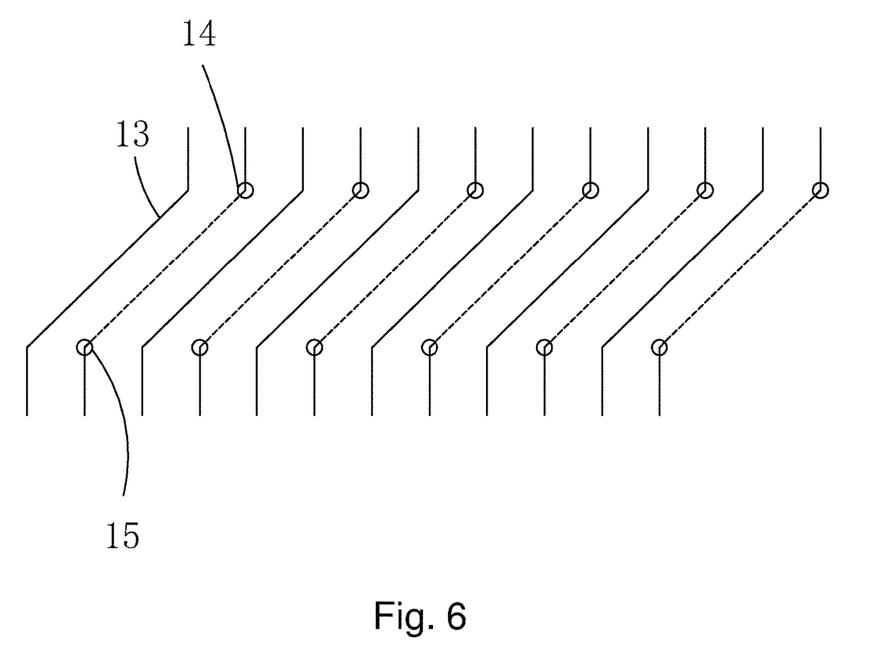
FIG. 6 is a schematic view showing the top view of the non-active area of the display device provided by the first embodiment of the present invention.

Moreover, refer to FIG. 5 and FIG. 6. As shown in FIG. 5, in the know technology, all the WOA wires 500 are disposed on the same side of the substrate, and occupy a larger wiring area, and a larger width of non-display area is required. As shown in FIG. 6, a part of the WOA 13 is disposed on the front side of the flexible substrate 1 and the other part is disposed on the back side of the flexible substrate 1, and the part of the WOA 13 on the back side of the flexible substrate 1 passes through the holes in the flexible substrate 1 to extend to the front side. As such, the circuit area utilization is improved so that the same size of substrate area can carry almost twice the circuit structure to reduce the border width of the non-active area to achieve borderless or ultra-narrow borders.

Refer to FIG. 2. The display device of the present invention further comprises: a driver circuit board 2, and a source driver chip 3 and a gate driver chip 4, both electrically connected to the driver circuit board 2; the WOA 13 is electrically connected to the source driver chip 3 and the gate driver chip 4 respectively. The active area 11 is disposed with a plurality of vertical source lines arranged in parallel and with intervals, and a plurality of horizontal scan lines arranged in parallel and with intervals, and each wire of the WOA 13 is electrically connected to a source line or scan line correspondingly. The data signal (Data) provided by the source driver chip 3 is inputted to the source line through the WOA 13, and the scan signal (Gate) provided by the gate driver chip 4 is inputted to the scan line through the WOA 13 to achieve displaying. The source driver chip 3 and the gate driver chip 4 generate respective data signals and scan signals according to the low-voltage differential signaling (LVDS) provided by the driver circuit board 2.

Refer to FIG. 3. The display device of the present invention can further adopt gate on array (GOA) technology. In this case, the display device further comprises: a driver circuit board 2, and a source driver chip 3 electrically connected to the driver circuit board 2; the WOA 13 is electrically connected to the source driver chip 2 and the driver circuit board 2 respectively; the non-active area 12 is disposed with a GOA circuit 4', and the WOA 13 is electrically connected to the active area 11 through the GOA circuit 4'. The active area 11 is disposed with a plurality of vertical source lines arranged in parallel and with intervals, and a plurality of horizontal scan lines arranged in parallel and with intervals, and each wire of the WOA 13 is electrically connected to a source line or to a scan line through the GOA circuit 4'. The data signal (Data) provided by the source driver chip 3 is inputted to the source line through the WOA 13, and the LVDS signal provided by the gate driver chip 4 is inputted to the GOA circuit 4' through the WOA 13, and the GOA circuit 4' generates corresponding scan signals for each scan line. The GOA circuit 4' comprises a plurality of GOA units corresponding one-to-one to the plurality of scan lines.

In summary, The present invention provides a display device, which employs ultra-thin flexible substrate with WOA disposed on both sides of the flexible substrate, wherein the WOA on the front side is directly connected to the active area, and the WOA on the back side passes through the holes in the flexible substrate to extend to the front side to connect to the active area. As such, the circuit area utilization is improved so that the same size of substrate area can carry almost twice the circuit structure to reduce the border width of the non-active area to achieve borderless or ultra-narrow borders.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display device, which comprises: a flexible substrate, and flexible substrate comprising an active area, and a non-active area surrounding the active area;

the non-active area of the flexible substrate being disposed with a plurality of wires on array (WOA) electrically connected to the active area to provide driving signals to the active area;

the WOA being disposed on both front and back sides of the flexible substrate, wherein the WOA disposed on the back side of the flexible substrate having one end passing through a first hole disposed on the flexible substrate and extending to the front side to connect and receive driving signals and the other end passing through a second hole disposed on the flexible substrate and extending to the front side to electrically connected to the active area;

wherein the WOA disposed on the front side of the flexible substrate comprises a main section disposed on the front side and a first and a second terminal sections also disposed on the front side and respectively connected to two opposite ends of the main section and the WOA disposed on the back side of the flexible substrate comprises a main section that is disposed on the back side and a first terminal segment and a second terminal segment that are located on the front side and are respectively connected to two opposite ends of the main section through the first and second holes, respectively, wherein the main section and first and second terminal segments are arranged to stagger with respect to each other in an extension direction of the main section; and wherein the first terminals of the wires on array that are disposed on both the front side and the back side are alternately arranged on the front sides in a first direction and second terminals of the wires on array that are disposed on both the front side and the back side are all connected to the active area of the display device; and wherein the main sections of the wires on array that are disposed on the front side of the flexible substrate are alternate with the main sections of the wires on array that are disposed on the back side of the flexible substrate in the first direction and also in a second direction that is different from the first direction, each of the main sections of the wires on array that are disposed on one of the front side and the back side being arranged to correspond to a space between two adjacent ones of the main sections of the wires on array that are disposed on the other one of the front side and the rear side.

2. The display device as claimed in claim 1, wherein the material of the flexible substrate is polyimide, polyethylene terephthalate, cycloolefin copolymer, or polyether resin.

3. The display device as claimed in claim 1, wherein the thickness of the flexible substrate is 10-300 μm.

4. The display device as claimed in claim 1, wherein the display device further comprises: a driver circuit board, and a source driver chip and a gate driver chip, both electrically connected to the driver circuit board; and the WOA is electrically connected to the source driver chip and the gate driver chip respectively.

5. The display device as claimed in claim 4, wherein the active area is disposed with a plurality of vertical source lines arranged in parallel and with intervals, and a plurality of horizontal scan lines arranged in parallel and with intervals; and each wire of the WOA is electrically connected to a source line or scan line correspondingly.

6. The display device as claimed in claim 1, wherein the display device further comprises: a driver circuit board, and a source driver chip electrically connected to the driver circuit board; and the WOA is electrically connected to the source driver chip and the driver circuit board respectively; and the non-active area is disposed with a gate on array (GOA) circuit, and the WOA is electrically connected to the active area through the GOA circuit.

7. The display device as claimed in claim 6, wherein the active area is disposed with a plurality of vertical source lines arranged in parallel and with intervals, and a plurality of horizontal scan lines arranged in parallel and with intervals; and each wire of the WOA is electrically connected to a source line or to a scan line through the GOA circuit.

8. The display device as claimed in claim 1, wherein the plurality of wires of WOA is disposed in the same film layer, and is made of copper.

9. The display device as claimed in claim 1, wherein the plurality of wires of WOA is disposed in the different film layers separated by insulting layers, and is made of graphene.

10. The display device as claimed in claim 1, wherein the WOA disposed on the back side of the flexible substrate is covered with a protective layer.

11. A display device, which comprises: a flexible substrate, and flexible substrate comprising an active area, and a non-active area surrounding the active area;

the non-active area of the flexible substrate being disposed with a plurality of wires on array (WOA) electrically connected to the active area to provide driving signals to the active area;

the WOA being disposed on both front and back sides of the flexible substrate, wherein the WOA disposed on the back side of the flexible substrate having one end passing through a first hole disposed on the flexible substrate and extending to the front side to connect and receive driving signals and the other end passing through a second hole disposed on the flexible substrate and extending to the front side to electrically connected to the active area;

wherein the WOA disposed on the front side of the flexible substrate comprises a main section disposed on the front side and a first and a second terminal sections also disposed on the front side and respectively connected to two opposite ends of the main section and the WOA disposed on the back side of the flexible substrate comprises a main section that is disposed on the back side and a first terminal segment and a second terminal segment that are located on the front side and are respectively connected to two opposite ends of the main section through the first and second holes, respectively, wherein the main section and first and second terminal segments are arranged to stagger with respect to each other in an extension direction of the main section;

wherein the first terminals of the wires on array that are disposed on both the front side and the back side are alternately arranged on the front sides in a first direction and second terminals of the wires on array that are disposed on both the front side and the back side are all connected to the active area of the display device; and wherein the main sections of the wires on array that are disposed on the front side of the flexible substrate are alternate with the main sections of the wires on array that are disposed on the back side of the flexible substrate in the first direction and also in a second direction that is different from the first direction, each of the main sections of the wires on array that are disposed on one of the front side and the back side being arranged to correspond to a space between two adjacent ones of the main sections of the wires on array that are disposed on the other one of the front side and the rear side;

wherein the material of the flexible substrate is polyimide, polyethylene terephthalate, cycloolefin copolymer, or polyether resin;

wherein the thickness of the flexible substrate is 10-300 μm.

12. The display device as claimed in claim 11, wherein the display device further comprises: a driver circuit board, and a source driver chip and a gate driver chip, both electrically connected to the driver circuit board; and the WOA is electrically connected to the source driver chip and the gate driver chip respectively.

13. The display device as claimed in claim 12, wherein the active area is disposed with a plurality of vertical source lines arranged in parallel and with intervals, and a plurality of horizontal scan lines arranged in parallel and with intervals; and each wire of the WOA is electrically connected to a source line or scan line correspondingly.

14. The display device as claimed in claim 11, wherein the display device further comprises: a driver circuit board, and a source driver chip electrically connected to the driver circuit board; and the WOA is electrically connected to the source driver chip and the driver circuit board respectively; and the non-active area is disposed with a gate on array (GOA) circuit, and the WOA is electrically connected to the active area through the GOA circuit.

15. The display device as claimed in claim 14, wherein the active area is disposed with a plurality of vertical source lines arranged in parallel and with intervals, and a plurality of horizontal scan lines arranged in parallel and with intervals; and each wire of the WOA is electrically connected to a source line or to a scan line through the GOA circuit.

16. The display device as claimed in claim 11, wherein the plurality of wires of WOA is disposed in the same film layer, and is made of copper.

17. The display device as claimed in claim 11, wherein the plurality of wires of WOA is disposed in the different film layers separated by insulting layers, and is made of graphene.

18. The display device as claimed in claim 11, wherein the WOA disposed on the back side of the flexible substrate is covered with a protective layer.

* * * * *